June 1, 1965
J. A. BODET  3,186,138
METHODS OF PREPARING SHEETS OR STRIPS CONTAINING DOSES OF
PRODUCTS AND IN PARTICULAR SUPPOSITORIES
Filed Oct. 31, 1962
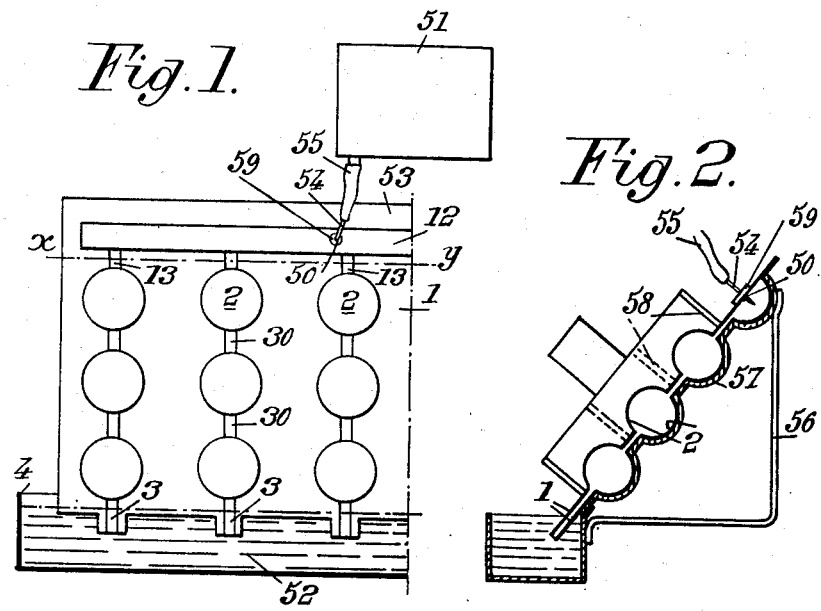
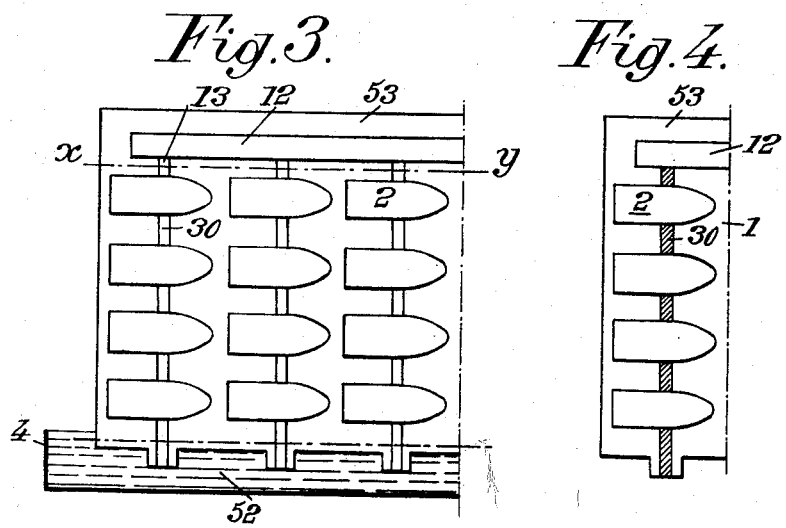

United States Patent Office 3,186,138
Patented June 1, 1965

3,186,138
METHODS OF PREPARING SHEETS OR STRIPS CONTAINING DOSES OF PRODUCTS AND IN PARTICULAR SUPPOSITORIES
Jean Augustin Bodet, 42 Ave. Marechal Douglas Haig, Versailles, France
Filed Oct. 31, 1962, Ser. No. 234,349
Claims priority, application France, Dec. 4, 1961, 880,911
1 Claim. (Cl. 53—37)

The present invention relates to processes for distributing dosed products to be sold under the solid or liquid form but anyway introduced in the liquid form in their packing means, said packing means being obtained in particular from plates or strips provided with recesses and made of a plastic or other material.

It has already been proposed to make use, in order to fill the recesses, of the action of a vacuum preliminarily produced in a container where the liquid is present, the recessed supports dipping in this liquid at their lower ends, after which the vacuum is suppressed in said container so that the liquid penetrates into the recesses where the vacuum had remained. Supplementary recesses or channels are provided to receive the residual air at the end of the filling operation.

The present invention consists essentially in dispensing with said container, the vacuum being applied directly to the recesses at the top ends thereof, at least one supplementary cavity being provided above said recesses so as to receive the residual air, said cavity serving also to connect together the respective recesses, or groups of recesses if there are several of them.

Preferred embodiments of my invention will be hereinafter described with reference to the appended drawings, given merely by way of example, and in which:

FIG. 1 is a diagrammatic elevational view of a portion of a plant for filling recesses of a receptacle, according to the invention;

FIG. 2 shows a similar system seen sidewise and in section;

FIG. 3 is a view similar to FIG. 1 but relating to another embodiment of the invention;

FIG. 4 shows a portion of FIG. 3 after some supplementary steps have been taken.

The packing means for the products to be stored generally comprise, as shown, two plates or sheets of a plastic material at least one of which is shaped so as to constitute, after assembly of these two sheets, recesses intended to contain the liquid product. On the drawings, these sheets have been shown at 1 and these recesses at 2, said recesses having any suitable shape, for instance a rounded shape (FIGS. 1 and 2) or an elongated shape (FIGS. 3 and 4, which relate more particularly to suppositories).

Such plastic supports 1 further comprise at least one channel 12 intended to connect together several rows of recesses 2 through conduits 13. All the recesses of the same group are connected together through conduits 30. In order to fill up recesses 2, use is made of channel 12 which is connected at 50 to a vacuum pump 51.

Advantageously, as shown, use is made of a needle 54 connected through a flexible conduit 55 to the vacuum source 51, which needle is driven through the wall of channel 12.

Gastightness may be ensured by a packing member 59 of rubber or an analogous material which is applied by means of glue against the wall of channel 12.

Support 1 with its recesses 2 is held in such manner that its lower ends 3 are dipping in the liquid 52 contained at the bottom of a vessel 4. For instance said support 1 is supported by a base 56, 57 (FIG. 2) the inclination of part 57 being advantageously adjustable.

When pump 51 is brought into action it causes the liquid to rise up into the respective recesses 2. The operation may be stopped when the liquid reaches the level x–y.

It remains only, after having closed the hole, at 50 and possibly after having waited until a matter in recesses 2 has become solid, to separate the recesses from one another which may be done through any suitable means. Preferably a heating action is exerted on channels 30 and 13 so as to flatten them up before separating the respective recesses.

FIG. 4 shows at 30, in cross hatching, the areas where this operation is to be performed, for instance by means of a set of electrodes of suitable shape such as visible at 58 (FIG. 2) and bearing against base 57 which may act as a counter-electrode.

When this operation has been performed the supports may be cut along line x–y so as to remove portion 53 which need not be maintained.

It will be seen that, anyway, owing to the presence of channel 12 it is possible to fill up the recesses by the action of the vacuum, it being understood that this channel 12 might be of any other shape.

In a general manner while I have, in the above description, disclosed what I deem to be a practical and efficient embodiment of my invention, I do not wish to be limited thereto as there might be changes made in the arrangement, disposition and form of the parts without departing from the principle of my invention as comprehended within the scope of the appended claim.

What I claim is:

A method of packaging a flowable substance which comprises starting from a receptacle made of a plastic material and comprising at least two cavities communicating with each other through a communication channel and forming together a closed space, with an inlet channel opening directly into one of said cavities and an outlet chamber in direct communication with the other of said cavities, placing said inlet channel in communication with said flowable substance, perforating said outlet chamber by means of a hollow needle, the inside of said needle being placed in communication with a source of vacuum, and, after said flowable substance has filled said cavities and channels closing said channels by sealing.

References Cited by the Examiner
UNITED STATES PATENTS

| 1,397,631 | 11/21 | Goodchild | 53—40 X |
| 1,713,755 | 5/29 | Gibson | 53—7 X |
| 2,764,857 | 10/56 | Schaefer | 53—12 |

FOREIGN PATENTS 675,274   7/52   Great Britain.

FRANK E. BAILEY, Primary Examiner.
TRAVIS S. McGEHEE, Examiner.